(12) United States Patent
Yoshida et al.

(10) Patent No.: US 7,313,189 B2
(45) Date of Patent: Dec. 25, 2007

(54) RECEIVER WHICH DEMODULATES OFDM SYMBOL

(75) Inventors: Makoto Yoshida, Kawasaki (JP); Eizou Ishizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 689 days.

(21) Appl. No.: 10/784,437

(22) Filed: Feb. 23, 2004

(65) Prior Publication Data

US 2004/0184550 A1 Sep. 23, 2004

(30) Foreign Application Priority Data

Mar. 20, 2003 (JP) ............................. 2003-078717

(51) Int. Cl.
*H04L 27/28* (2006.01)
*H04J 11/00* (2006.01)

(52) U.S. Cl. ...................................... 375/260; 370/210

(58) Field of Classification Search ................ 375/144, 375/148, 260, 340, 346; 370/206, 208, 210
See application file for complete search history.

(56) References Cited

U.S. PATENT DOCUMENTS

| 6,928,120 B1 * | 8/2005 | Zhang | ......................... 375/260 |
| 2004/0091057 A1 * | 5/2004 | Yoshida | ...................... 375/260 |

FOREIGN PATENT DOCUMENTS

JP 11-298434 10/1999

OTHER PUBLICATIONS

Suyama, S., Hara, Y., Suzuki, H., Kamio, Y. and Fukawa, K., "An OFDM Receiver Scheme for Multipath Environments with Delay Profile over the Guard Interval," Technical Report of The Institute of Electronics, Information and Communication Engineers, RCS 2001-175, Nov. 2001, pp. 45-50, English Abstract.

Suyama, S., Suzuki, H. and Fukawa, K., "An OFDM Receiver with Smoothed FFT-Window and RLS-MLSE for Fast Multipath Fading Environments with Large Delay Spread," IEEE 7th International Symposium on Spread-Spectrum Techniques and Applications, Sep. 2, 2002, vol. 2, pp. 353-357.

Kim, D. and Stuber, G.L., "Residual ISI Cancellation for OFDM with Applications to HDTV Broadcasting," IEEE Journal on Selected Areas in Communications, vol. 16, No. 8, Oct. 1998, pp. 1590-1599.

European Search Report for EP Application 04004056.0 dated Aug. 22, 2007.

* cited by examiner

*Primary Examiner*—Young T. Tse
(74) *Attorney, Agent, or Firm*—Myers Wolin, LLC

(57) ABSTRACT

A receiver is disclosed that demodulates an Orthogonal Frequency Division Multiplexing (OFDM) symbol transmitted by an OFDM method. The receiver includes a delay profile generation unit that generates a delay profile regarding a preceding wave and a delayed wave included in a received signal, a demodulation unit that demodulates the received signal so as to output a demodulated signal per sub-carrier, a hard-decision unit that makes a hard decision per sub-carrier on a signal point based on the demodulated signal so as to output a hard-decision signal, a replica generation unit that uses the hard-decision signal to generate a replica signal per sub-carrier, and an inter-carrier interference suppression unit that adds a difference between the hard-decision signal and the replica signal to the demodulated signal so as to suppress an inter-carrier interference.

12 Claims, 7 Drawing Sheets

RECEIVER WHICH DEMODULATES OFDM SYMBOL

BACKGROUND OF THE INVENTION

1. Field of the Invention

The present invention generally relates to a technology for demodulating a received signal, and particularly relates to a receiver for demodulating a signal which is transmitted by the Orthogonal Frequency Division Multiplexing (OFDM) method (or an OFDM signal or symbol).

2. Description of the Related Art

In wideband wireless communications, or the next-generation mobile communications currently being studied within the technical field, a system which provides for a multi-path propagation environment needs to be built. The multi-carrier modulation method suppresses an effect of selective frequency fading, which becomes particularly problematic in the multi-path propagation environment, by using a plurality of carriers (or sub-carriers) in a predetermined transmission band so as to transmit signals in parallel. The OFDM method in particular adds a Guard Interval (GI) between symbols which are effective. Hereby, for a multi-path delayed wave within the GI duration, effective suppression, of inter-symbol interference, modulation without using equalization, and effective handling of the multi-path fading are enabled. On the other hand, the delay spread differs greatly from one communications environment to another. For example, even if the delay amount were about 0.2 to 2.0 µs in an urban area, it may reach 10 to 20 µs in a hilly terrain or a basin. Therefore, from such a point of view, a guard interval having a length which is sufficiently long to subsume all delayed waves which arrive following the preceding wave should be set up.

However, as the guard interval is a redundant symbol, there is a need to maintain the ratio between the guard interval and the effective symbol duration at a predetermined level or above by increasing the whole OFDM symbol duration so as not to decrease the transmission efficiency while setting the long guard interval. However, as the OFDM symbol length is increased, the fading within one symbol duration will no longer be constant so that it will be less immune to fading. Furthermore, with the increase in the OFDM symbol duration (T-S), the sub-carrier spacing ($\Delta f=1/T$-S) will become smaller so that it will be less immune to Doppler shift and also the peak-to-average power ratio will increase (a performance degradation due to non-linear distortion will take place). Therefore, it is common to set up the guard interval having an appropriate length so as to separately perform some compensation for the delayed wave which arrives at a delay exceeding the guard interval duration.

In the Non-Patent Document 1, at the time of the Fast Fourier Transform (FFT) in the demodulation processing, filtering is performed in the time domain on the portion causing interference and a Maximum-Likelihood Sequence Estimation (MLSE) is performed, in order to suppress the ISI (Inter-Symbol Interference) which affects the whole band used (refer to Patent Document 1 for an example of other related-art methods).

Non-Patent Document 1

Suyama, "OFDM reception method in multi-path environment having delay profile exceeding guard interval", Technical Report of the Institute of Electronics, Information and Communication Engineers RCS 2001-175, November 2001

Patent Document 1
JP11-298434A

However, according to a technology such as discussed in Non-Patent Document 1, a Viterbi equalizer having $M^2$ states (where M is a modulation index) is needed per sub-carrier. Therefore, the method is disadvantageous from such points of view as circuit size, computational complexity, and power consumption of the receiver. It is particularly disadvantageous for use in a mobile communications device which needs to be kept small.

Incidentally, a study is currently underway on a communications system which seeks to improve the signal transmission efficiency using an adaptive modulation. As the provision of a receiver circuit which is adapted to the largest modulation index M is needed when the related-art technology is used in the communications system, the related-art method is also disadvantageous from the point of view that embedding in the adaptive modulation system is difficult.

Furthermore, the related-art method is also disadvantageous as a hard decision of a demodulated signal is made by performing the MLSE so that, likelihood information for the soft-decision information, is lost and the error correction technology cannot be utilized 100%.

SUMMARY OF THE INVENTION

It is a general object of the present invention to provide a technology for demodulating a received signal that substantially obviates one or more problems caused by the limitations and disadvantages of the related art.

In view of the above points, it is a more particular object of the present invention to provide a receiver for demodulating a signal which is transmitted by the Orthogonal Frequency Division Multiplexing (OFDM) method (or an OFDM signal or symbol).

According to the invention, a receiver which demodulates an OFDM symbol transmitted by an OFDM method includes a delay profile generation unit which generates a delay profile regarding a preceding wave and a delayed wave which are included in a received signal, a demodulation unit which demodulates the received signal so as to output a demodulated signal per sub-carrier, a hard-decision unit which makes a hard decision per sub-carrier on a signal point based on the demodulated signal so as to output a hard-decision signal, a replica generation unit which uses the hard-decision signal to generate a replica signal per sub-carrier, and an inter-carrier interference suppression unit which adds a difference between the hard-decision signal and the replica signal to said demodulated signal so as to suppress inter-carrier interference, wherein the replica generation unit includes a time-domain received signal generation unit which inverse-Fourier transforms the hard-decision signal so as to generate a received signal in the time domain, a signal component suppression unit which suppresses, by using a preceding symbol that is an already-demodulated OFDM symbol which precedes a target demodulating symbol that is a target OFDM symbol to be demodulated, a signal component of the preceding symbol which is included in the delayed wave, a modified received signal generation unit which adds, before the target demodulating symbol in the delayed wave, a portion of the received signal in the time domain, and a replica signal generation unit which generates the replica signal by Fourier-transforming the modified received signal.

The receiver which demodulates the OFDM symbol transmitted by the OFDM method as described above enables the provision of a receiver which reduces the inter-symbol interference which is caused by the delayed wave which arrives with a delay exceeding the guard interval in the OFDM symbol. Furthermore, the provision of a receiver which has a small-sized demodulation circuit and the maintenance of the soft-decision information at the time of the demodulation are enabled.

According to another aspect of the invention, a receiver which demodulates an OFDM symbol transmitted by an OFDM method includes a delay profile generation unit which generates a delay profile regarding a preceding wave and a delayed wave which are included in a received signal, a signal component suppression unit which suppresses by using a preceding symbol that is an already-demodulated OFDM symbol which precedes a target demodulating symbol that is a target OFDM symbol to be demodulated a signal component of the preceding symbol which is included in the delayed wave, a demodulation unit which demodulates the received signal so as to output a demodulated signal per sub-carrier, a hard-decision unit which makes a hard decision per sub-carrier on a signal point based on the demodulated signal so as to output a hard-decision signal, a replica generation unit which uses the hard-decision signal to generate a replica signal per sub-carrier, and an inter-carrier interference suppression unit which adds the difference between the hard-decision signal and the replica signal to the demodulated signal so as to suppress inter-carrier interference, wherein the replica generation unit includes a time-domain received signal generation unit which inverse-Fourier transforms the hard-decision signal so as to generate a received signal in the time domain, a modified received signal generation unit which adds, before the target demodulating symbol in the delayed wave, a portion of the received signal in the time domain, and a replica signal generation unit which generates the replica signal by Fourier-transforming the modified received signal.

The receiver which demodulates the OFDM symbol transmitted by the OFDM method as described above enables the provision of a receiver which reduces the inter-symbol interference which is caused by the delayed wave which arrives with a delay exceeding the guard interval in the OFDM symbol. Furthermore, the provision of a receiver which has a small-sized demodulation circuit and performs the maintenance of the soft-decision information at the time of the demodulation is enabled.

Other objects and further features of the present invention will become apparent from the following detailed description when read in conjunction with the accompanying drawings.

DETAILED DESCRIPTION OF THE PREFERRED EMBODIMENTS

In the following, embodiments of the present invention are described with reference to the accompanying drawings.

Figure 1:
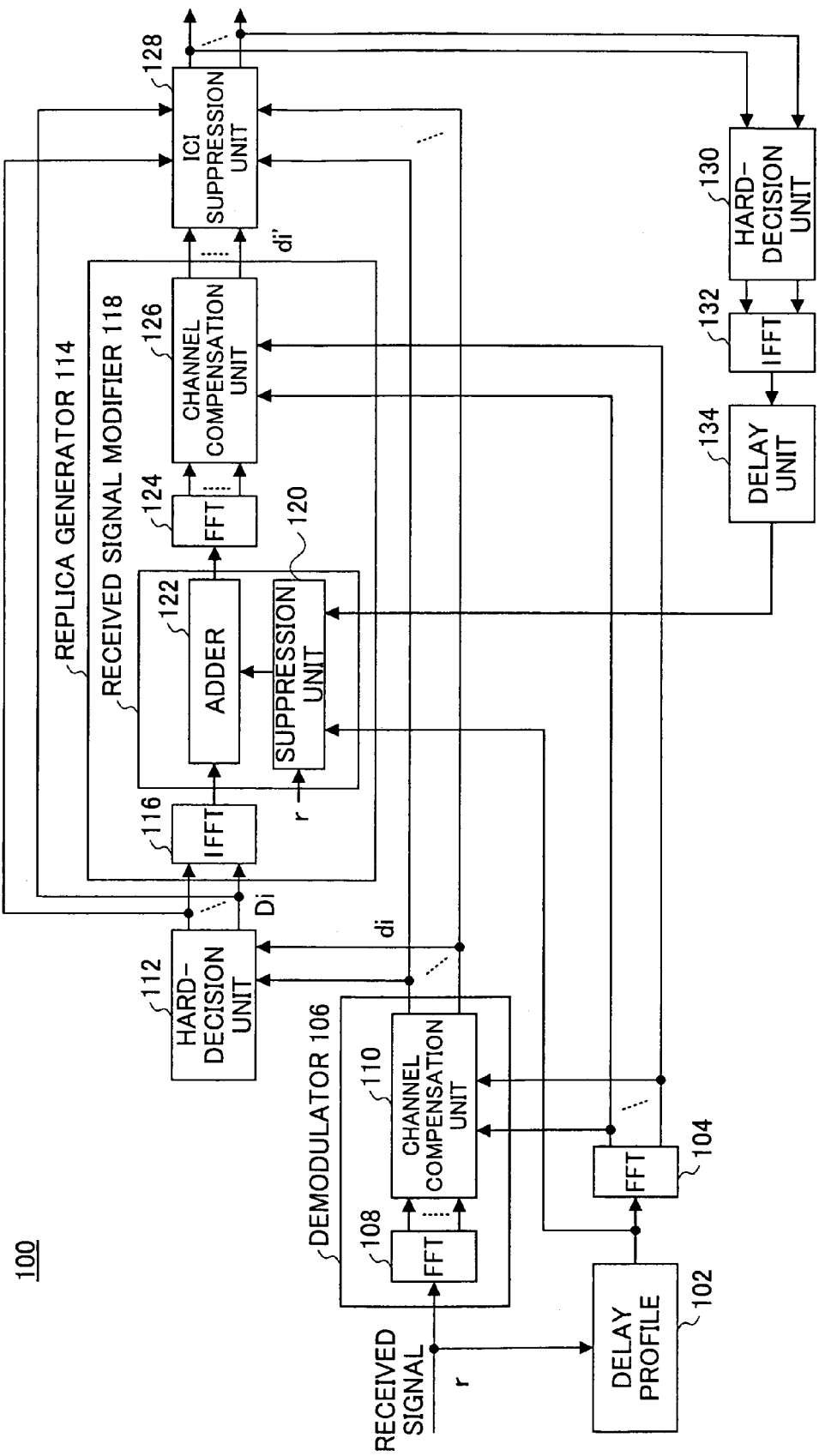
FIG. 1 is a functional block diagram of a receiver according to a first embodiment of the present invention.

FIG. 1 is a functional block diagram of a receiver according to a first embodiment of the present invention. The receiver 100 comprises a delay profile generator 102 which receives a signal which is transmitted by the OFDM method so as to generate a delay profile regarding the received signal. The output of the delay profile generator 102 is provided to the FFT 104 which performs FFT on the input signal. Besides, for brevity, the portions which perform the serial-to-parallel conversion and the parallel-to-serial conversion related to the FFT process and the below IFFT (Inverse FFT) process are omitted. The receiver 100 comprises a demodulator 106, the demodulator 106 comprising a FFT 108 which performs FFT on the received signal and a channel compensation unit 110 which is connected to the FFT 108. The channel compensation unit 110 based on the information from the delay profile 102 which is obtained via the FFT 104 adjusts per sub-carrier the amplitude and the phase of the signal from the FFT 108 so as to output the demodulated signals.

The receiver 100 comprises a hard-decision unit 112 which is connected to the demodulator 106, the hard-decision unit 112 making a hard-decision per sub-carrier on the signal point which is obtained from the demodulator 106. The receiver 100 comprises a replica generator 114 which is connected to the hard-decision unit 112. The replica generator 114 is connected to the hard-decision unit 112 and comprises an IFFT 116 which performs inverse FFT. The replica generator 114 comprises a received signal modifier 118 which is connected to the IFFT 116, the received signal modifier 118 comprising a suppression unit 120 which suppresses an interfering component within the received signal and an adder 122 which adds a predetermined signal component to the interference section having the interfering component included. The replica generator 114 comprises a FFT 124 which is connected to the received signal modifier 118 so as to perform FFT. Furthermore, the replica generator 114 comprises a channel compensation unit 126 which is connected to the FFT 124. An output of the channel compensation unit 126 is a replica signal per sub-carrier, the replica signal providing an output of the replica generator 114. The receiver 100 comprises an ICI suppression unit 128, the suppression unit 128 suppressing Inter-Carrier Interference (ICI) by adding the difference between the input and the output of the replica generator 114 to the demodulated signals from the demodulator 106.

Furthermore, the receiver 100 comprises the hard-decision unit 130 which is connected to the ICI suppression unit 128 so as to make a hard decision per sub-carrier on the signal point. The receiver 100 comprises an IFFT 132 which is connected to the hard-decision unit 130 so as to perform IFFT. The receiver 100 comprises a delay unit 134 which is connected to the IFFT 132 so as to delay the input signal by one symbol period. The delay unit 134 is connected to the suppression unit 120 within the received signal modifier 118.

The operations are described below. The OFDM signal which is received at the receiver 100 is converted to a baseband signal via a wireless unit (not illustrated) so as to be input to the delay profile generator 102 after the removing of the guard interval. The delay profile generator 102 finds the timing, the amplitude (or the energy), and the phase of a preceding wave included in the received signal r and a plurality of delayed waves arriving with a delay relative to the preceding wave. The respective delayed waves are also called "multi-path components", or just "paths". The information regarding the delay profile (the timing, the amplitude and the phase) is provided to the received signal modifier 118 which performs processing in the time domain. Also, the information regarding the delay profile is provided to the channel compensation units 110 and 126 after being further converted to information in the frequency domain at the FFT 104. For brevity, it is assumed that the received signal includes only two paths and the delay time of the delayed wave relative to the preceding wave is longer than the length of the guard interval.

The received signal r is demodulated via the FFT 108 and the channel compensation unit 110 at the demodulator 106 so as to output the demodulated signals d-i (where i=1, . . . , N, and N is the number of sub-carriers). As the received signal includes a delayed wave having a delay longer than the guard interval, the demodulated signals d-i are projected to be distorted relative to the original signals. The demodulated signals d-i are provided to the hard-decision unit 112 so that a hard decision is made per sub-carrier, the hard-decision unit 112 converting the respective demodulated signals d-i to hard-decision signals D-i. The hard-decision signals D-i are input to the IFFT 116 so as to be converted to the received signal in the time domain. The received signal in the time domain is modified at the received signal modifier 118.

Figure 2:
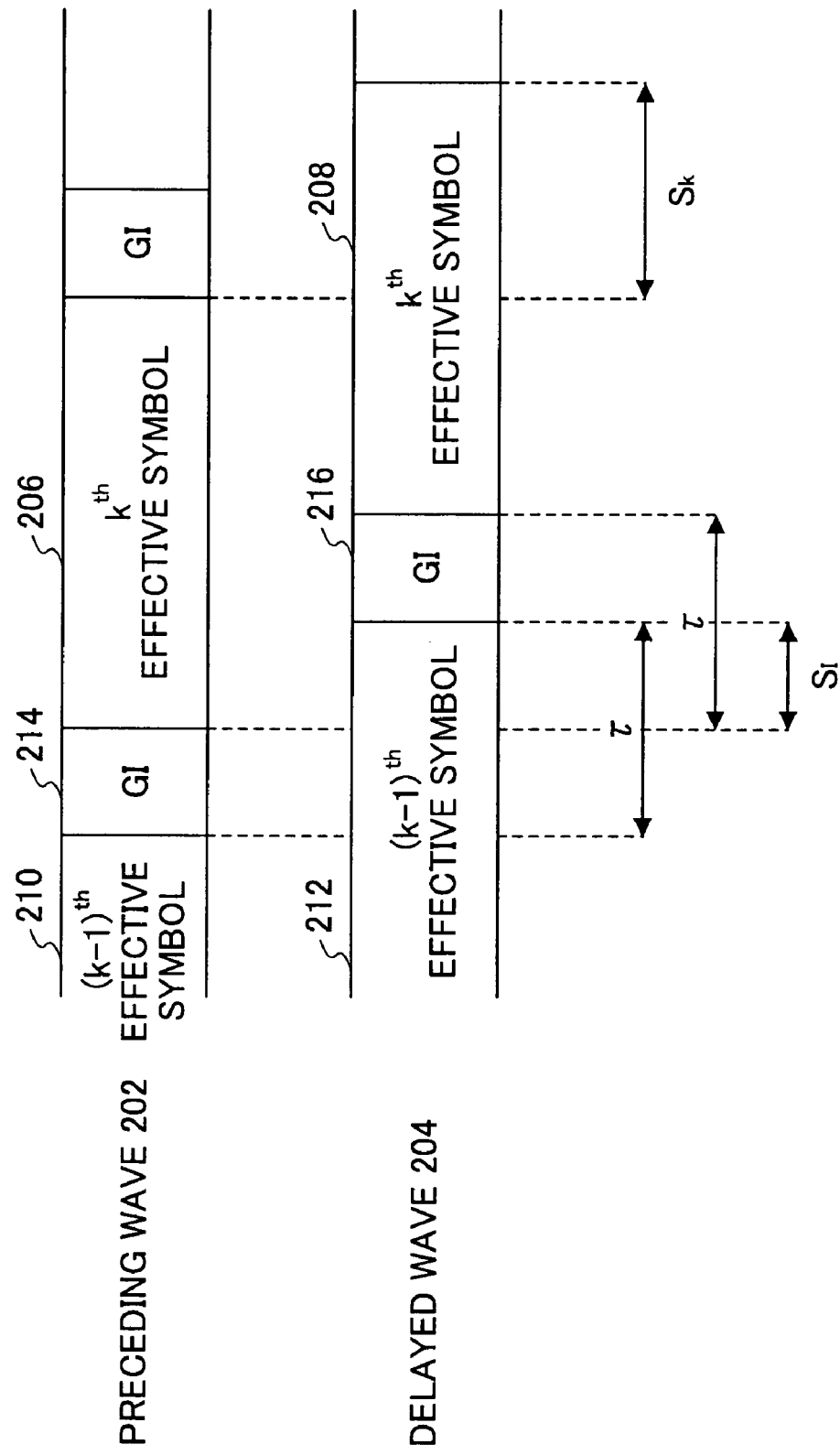
FIG. 2 is a timing chart of an example of a received signal.

FIG. 2 is a diagram which illustrates a preceding wave 202 and a delayed wave 204 which are included in the received signal. Although the preceding wave 202 and the delayed wave 204 are depicted separately, the waves overlap to comprise the received signal. As illustrated in FIG. 2, the kth OFDM symbols 206 and 208 which are the present demodulating targets, the preceding (k−1)th OFDM symbols 210 and 212, and the guard intervals 214 and 216 are depicted. The receiver receives a series of OFDM symbols so as to sequentially demodulate the OFDM symbols. Fourier transform at the time of demodulation is performed by aligning to an effective symbol period of the preceding wave (the part illustrated with the reference number 206 in the case of demodulating the kth OFDM symbol). In this case, as for the same symbol (the kth OFDM symbol) which is included in both the preceding and the delayed waves, there is very little inter-symbol interference because of the sub-carrier orthogonality. However, the inter-symbol interference which is produced between different symbols provides an impact which cannot be ignored. In this example, the kth OFDM symbol 206 in the preceding wave 202 and the (k−1)th OFDM symbol 212 in the delayed wave 204 (the interference section which is illustrated as S-I) cause inter-symbol interference.

The received signal which is affected by the inter-symbol interference is demodulated at the demodulator 106 so as to be output as the demodulated signals d-i. The demodulated signals d-i are provided with hard decisions at the hard-decision unit 112 so as to be output as the hard-decision signals D-i. For example, assuming the case of QPSK modulation in which the demodulated signal d−1 falls within the first quadrant of the signal constellation, the hard-decision signal D−1 will be a symbol which indicates (1,1). The hard-decision signals D-i are input to the IFFT 116 so as to be converted to the received signal in the time domain 216.

At the receiver 100, as the OFDM symbols are sequentially demodulated per reception of the symbols, the demodulation of the (k−1)th OFDM symbol will have been completed by the time the kth OFDM symbol is demodulated. The data of the (k−1)-th OFDM symbol is input to the hard-decision unit 130 per sub-carrier so as to be input to the IFFT 132 after the hard decision is made and to be input to the delay unit 134 which performs buffering for one symbol period. Therefore, by the time the kth OFDM symbol is demodulated, the (k−1)-th OFDM symbol will already have been demodulated and stored in the delay unit 134.

At the received signal modifier 118, the kth and the (k−1)-th received signals in the time domain are input. At the suppression unit 120, based on the timing, the amplitude and the phase relative to the delayed wave from the delay profile generator 102, the signal component of the interference section S-I which causes interference at the time of the demodulation of the kth OFDM symbol is extracted from within the (k−1)-th OFDM symbol. Then, the timing, the amplitude, and the phase are adjusted so as to offset the signal component of the interference section S-I of the delayed wave which is included in the received signal in the time domain. Besides, the interference section S-I is the latter portion of the (k−1)-th OFDM symbol in the delayed wave, the length of the section corresponding to the duration which is derived by subtracting the length of the guard interval GI from the delay amount τ of the delayed wave 204.

Furthermore, at the adder 122, the section having the length τ (where τ equals the delay amount of the delayed wave) which precedes the kth OFDM symbol in the delayed wave 204 is added to the signal from the suppression unit 120, while the timing, the amplitude, and the phase are adjusted so as to be made equal to S-k which is the latter portion of the kth OFDM symbol. The length of S-k is equal to τ, the contents of the signal being equal to the tail-end portion of the kth OFDM symbol which is tentatively demodulated at the present.

In other words, the received signal modifier 118 modifies a portion of the delayed wave 204 which is included in the received signal, the modification removing the interfering portion S-I of the (k−1)-th OFDM symbol so as to make the signal contents of the removed section S-I and those of the guard interval 216 portion equal to S-k. Besides, as the guard interval 216 portion equals the tail-end section of the kth OFDM symbol, the section in which the signal contents are actually modified at the received signal modifier 118 is the section corresponding to the interference portion S-I. The modified received signal will not include a signal component which causes inter-symbol interference with the kth OFDM symbol.

The received signal which is modified at the received signal modifier 118 is provided to the FFT 124 so as to be input to the channel estimator 126 after being Fourier-transformed and to be output as the replica signal d-i per sub-carrier.

After adding to the demodulated signals d-i the difference between the hard-decision signals D-i and the replica signals d-i, the ICI suppression unit 128 outputs the modified demodulated signal per sub-carrier. The output signal of the received signal modifier 118 includes the signal component regarding the preceding and the delayed waves, the signal component regarding the delayed wave modified for the kth OFDM symbol so as not to cause the inter-symbol interference. When the output signal is Fourier-transformed at the FFT 124 so as to compensate for the transmission channel, the replica signal having no inter-symbol interference impact is obtained per sub-carrier. On the other hand, the impact of inter-carrier interference on the received signal ripples through all sub-carriers as it is white to the respective carriers (or the inter-carrier interference has no frequency selectivity). Therefore, the difference between the input and the output signals at the replica generator 114 becomes the signal which indicates the impact of the inter-symbol interference (inter-carrier interference) per sub-carrier. The removal of the difference from the demodulated signals d-i enables the obtaining of the demodulated signals with the inter-carrier interference suppressed. The output signals of the ICI suppression unit 128 are provided to a latter stage processor (not illustrated), and also to the hard-decision unit 130 in order to provide for the demodulation of the subsequent (k+1)th OFDM symbol.

Figure 3:
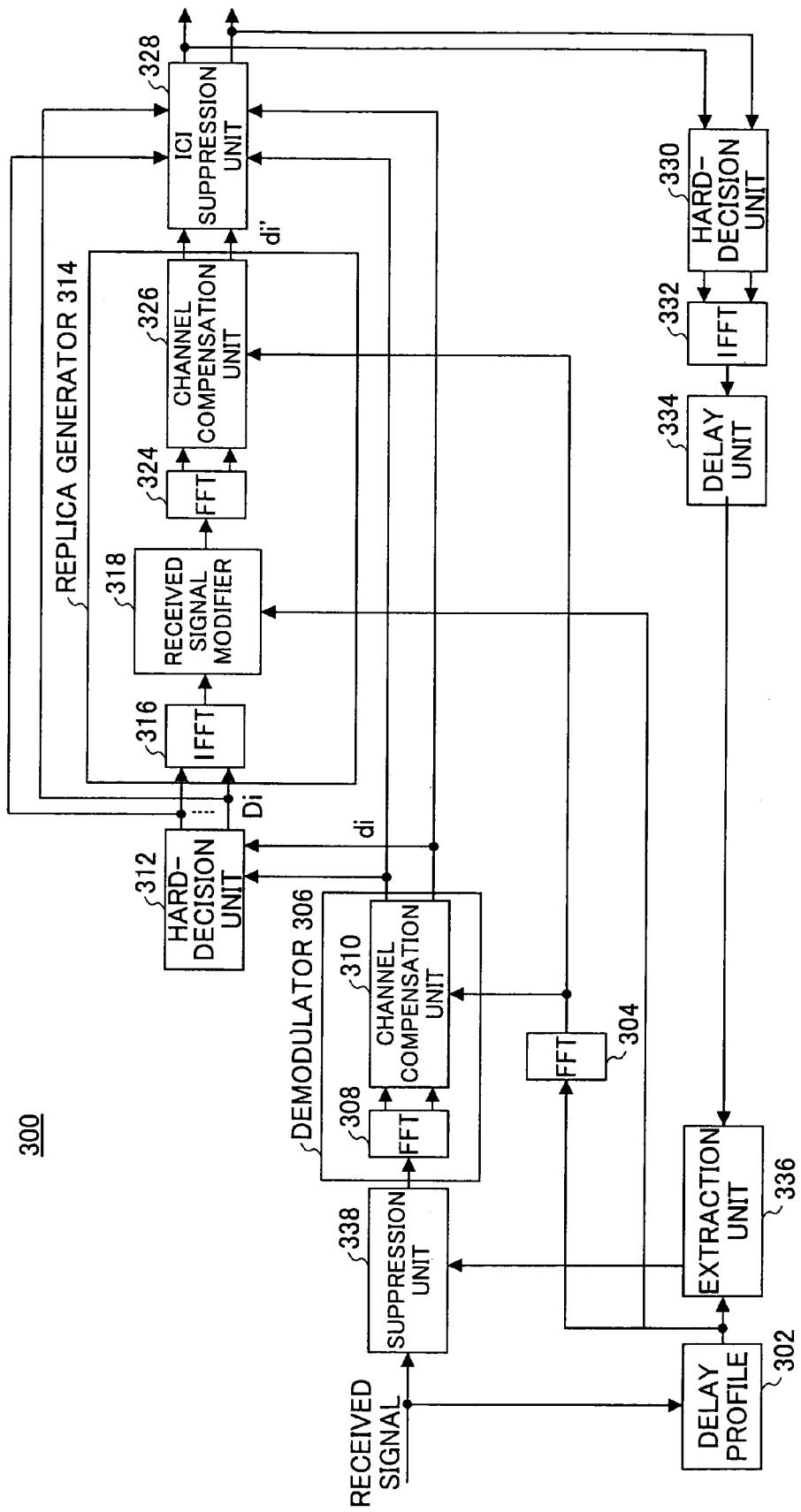
FIG. 3 is a functional block diagram of a receiver according to a second embodiment of the present invention.

FIG. 3 illustrates a functional block diagram of a receiver according to a second embodiment of the present invention. The receiver 300 comprises the delay profile generator 302 which receives the OFDM signal so as to generate the delay profile. The delay profile generator 302 is connected to the FFT 304 which performs FFT. Besides, for brevity, the portions which perform the serial-parallel conversion and/or the parallel-to-serial conversion related to FFT or IFFT are omitted. The receiver 300 comprises the demodulator 306, the demodulator 306 comprising the FFT 308 which performs FFT and the channel compensation unit 310 which is connected to the FFT 308. The channel compensation unit 310 adjusts the amplitude and the phase of the output signals of the FFT 308 based on the delay profile so as to output the demodulated signal per sub-carrier.

The receiver 300 comprises the hard-decision unit 312 which is connected to the demodulator 306, the hard-decision unit 312 making the hard decision per sub-carrier on the signal point which is obtained from the demodulator 306. The receiver 300 comprises the replica generator 314 which is connected to the hard-decision unit 312. The replica generator 314 comprises the IFFT 316 which is connected to the hard-decision unit 312 so as to perform inverse FFT. The replica generator 314 comprises the received signal modifier 318 which is connected to the IFFT 316, the received signal modifier 318 adding a predetermined signal component to the section in which the interfering component is included within the received signal. The replica generator 314 comprises the FFT 324 which is connected to the received signal modifier 318 so as to perform FFT. Furthermore, the replica generator 314 comprises the channel compensation unit 326 which is connected to the FFT 324. The outputs of the channel compensation unit 326 are adapted to be the outputs of the replica generator 314. The receiver 300 comprises the ICI suppression unit 328, the ICI suppression unit 328 suppressing the inter-carrier interference by adding to the demodulated signals from the demodulator 306 the difference between the inputs and the outputs of the replica generator 314.

The receiver 300 comprises the hard-decision unit 330 which is connected to the ICI suppression unit 328 so as to make the hard decision per sub-carrier on the signal point. The receiver 300 comprises the IFFT 332 which is connected to the hard-decision unit 330 so as to perform inverse FFT. The receiver 300 comprises the delay unit 334 which is connected to the IFFT 332 so as to delay the input signal by one symbol period.

Furthermore, the receiver 300 comprises an extraction unit 336 which extracts the inter-symbol interfering component, the extraction unit 336 extracting the already demodulated OFDM symbol from the delay unit 334 and, based on the information from the delay profile generator 302, the signal component of the interference section S-I which causes the inter-symbol interference. The receiver 300 comprises a suppression unit 338 which suppresses the inter-symbol interfering component included in the received signal, the suppression unit 338 combining the interfering component included in the received signal with the signal component which is extracted at the extraction unit 336 so as to offset the interfering component with the signal component, and providing the signal, with the interfering component removed, to the demodulator 308 at the latter stage.

The operations are described below. Similar to the first embodiment, the OFDM signal which is received at the receiver 300 is input to the delay profile generator 302. The delay profile generator 302 detects the timing, the amplitude (or the energy) and the phase of the plurality of delayed waves which arrive with a delay relative to the preceding wave. The information regarding the delay profile (the timing, the amplitude, and the phase) is provided to the received signal modifier 318 and the extraction unit 336 which perform processing in the time domain. Furthermore, the information regarding the delay profile is also provided to the channel compensation units 310 and 326 after being converted to the information in the frequency domain at the FFT 304. For brevity, it is assumed that the received signal contains only two paths and the delay time of the delayed wave relative to the preceding wave is longer than the length of the guard interval.

As the OFDM symbols are sequentially demodulated per reception of the symbols, where the kth symbol is the OFDM symbol to be demodulated at the present, the demodulation of the (k−1)th OFDM symbol will have been already completed by the time the kth symbol is demodulated. The respective data of the (k−1)th OFDM symbol are input to the hard-decision unit 330 per sub-carrier so as to have the hard decision made and then are input to the IFFT 332 and then to the delay unit 334 so as to perform the buffering for one symbol period. Therefore, by the time the kth OFDM symbol is demodulated, the demodulation of the (k−1)th OFDM symbol will already have been completed, and the results stored in the delay unit 334.

At the extraction unit 336, the signal component of the interference section S-I, which causes the interference at the time of demodulation of the kth OFDM symbol, from within the (k−1)th OFDM symbol based on the timing, the amplitude, and the phase relative to the delayed wave from the delay profile generator 302, is extracted (refer to FIG. 2). Then, the suppression unit 338 combines the signals of the interfering portion of the delayed wave which is included in the received signal and of the interfering portion S-I which is extracted at the extraction unit 336 so as to offset the portions while adjusting the amplitude and the phase of the portions. Besides, the adjustment of the timing, the amplitude, and the phase for the combining may be performed either at the extraction unit 336 or at the timing of the combining at the suppression unit 338. The received signal, with the portion causing the inter-symbol interference within the delayed wave included in the received signal suppressed, is provided to the demodulator 306.

The demodulator 306 demodulates the input signal by performing FFT and the channel compensation so as to output the demodulated signals d-i (where i=1, . . . , N, and N is the number of sub-carriers). The demodulated signals d-i are provided to the hard-decision unit 312 so as to have the hard decision per sub-carrier made, the hard-decision unit 312 converting the respective demodulated signals d-i to the hard-decision signals D-i. The hard-decision signals D-i are input to the IFFT 316 so as to be converted to the received signal in the time domain. The received signal in the time domain is further modified at the received signal modifier 318.

At the received signal modifier 318, the section having the length of τ which precedes the kth OFDM symbol within the delayed wave 204 (in FIG. 2) is modified so as to be made equal to the latter portion S-k of the kth OFDM symbol. The length of S-k equals τ, the contents of the signal being equal to the tail-end portion of the kth OFDM symbol which is tentatively demodulated at the present.

In other words, the interfering portion S-I regarding the (k−1)th OFDM symbol within the received signal has already been removed at the suppression unit 338. The received signal modifier 318 makes the signal contents of the removed section S-I and of the guard interval GI 216 portion equal to S-k. Besides, the guard interval 216 portion equals the tail-end portion of the OFDM symbol so that the section to which the actual modification of the signal contents is performed at the received signal modifier 318 is the section corresponding to the interfering portion S-I.

The received signal which is modified at the received signal modifier 318 is provided to the FFT 324 so as to be Fourier-transformed and then input to the channel compensation unit 326 so as to be output as the replica signal d-i per sub-carrier.

The ICI suppression unit 328 outputs per sub-carrier the modified demodulated signal by adding to the demodulated signals d-i the difference between the hard-decision signals D-i and the replica signals d-i. Similar to the first embodiment, the output signal of the received signal modifier 318 includes the signal component regarding the preceding and the delayed waves, the signal component of the delayed wave modified so as not to cause the inter-symbol interference with the kth OFDM symbol. When the output signal is Fourier-transformed at the FFT 324 so as to be compensated for the propagation channel, the replica signal having no impact of the inter-symbol interference is obtained per sub-carrier. Therefore, the difference between the input and the output signals at the replica generator 314 becomes the signal which indicates the inter-symbol interference between sub-carriers (inter-carrier interference). Therefore, the removal of the difference from the demodulated signals d-i enables the obtaining of a demodulated signal with the inter-carrier interference suppressed. The output signal at the ICI suppression unit 328 is provided to a processor at the latter stage, not illustrated, and also to the hard-decision unit 330 in order to provide for the demodulation of the subsequent (k+1)th OFDM symbol.

According to the present embodiment, the provision of the extraction unit 336 and of the suppression unit 338 enables the removal, before the demodulation at the demodulator 306, of the signal contents of the interfering portion S-I that causes the inter-symbol interference from the delayed wave within the received signal. Therefore, the demodulated signal d-i from the demodulator 306 will have higher precision relative to the case of the first embodiment in which FFT, etc., are performed with the signal of the interference section S-I included in the received signal. This will enable the improvement in the accuracy of the hard-decision result at the hard-decision unit 312 so as to appropriately remove the inter-carrier interference. However, the signal level of the interfering section which is determined to cause interference (the section indicated as S-I) from the delayed wave within the received signal which is input to the demodulator 306 is made to be zero (by adding the signal from the extraction unit). While the modified delayed wave will not cause as large an inter-symbol interference as in the case of the first embodiment, the demodulated signal at the demodulator 306 becomes somewhat distorted by setting all of the time-sampled information to be zero. The distortion is suppressed at the ICI suppression unit 328. In the second embodiment of the present invention, the suppression of the inter-carrier interference with precision higher than that in the first embodiment is enabled. On the other hand, the first embodiment is more advantageous than the second embodiment from the point of view of having a simpler configuration.

Figure 4:
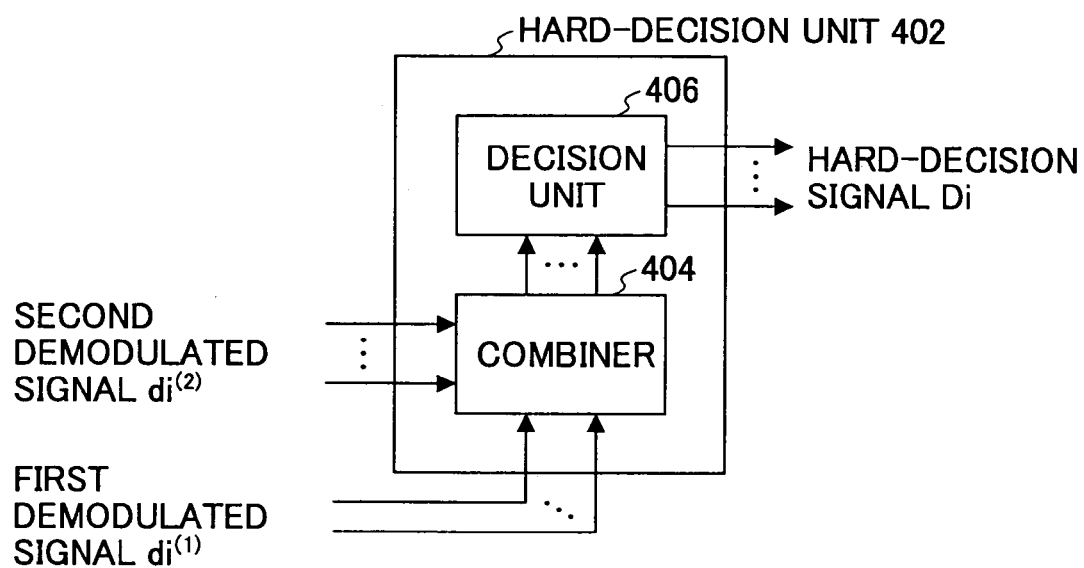
FIG. 4 is a schematic diagram of a variation of a hard-decision unit.

FIG. 4 is a diagram illustrating a variation of a hard-decision unit. In the present embodiment, an antenna-diversity receiver is assumed. The hard-decision unit 402 may be used in lieu of the hard-decision units 112 and 130 of the first embodiment, or the hard-decision units 312 and 330 of the second embodiment. The hard-decision unit 402 comprises a combiner 404 which combines a first demodulated signal d-i(1) and a second demodulated signal d-i(2). The hard-decision unit 402 comprises the decision unit 406 which makes the hard decision per sub-carrier on the respective combined demodulated signals.

In the present embodiment, such means for processing the received signal as those illustrated in FIG. 1 and in FIG. 3 are provided at the respective diversity branches. At the combiner 404, the demodulated signal at a certain diversity branch. (or the first demodulated signal d-i(1)) and the demodulated signal at another diversity branch (or the second demodulated signal d-i(2)) are combined. Hereby, improvement in the precision of the demodulated signal and in the accuracy of the hard decision, and appropriate removal of inter-carrier interference are enabled.

Figure 5:
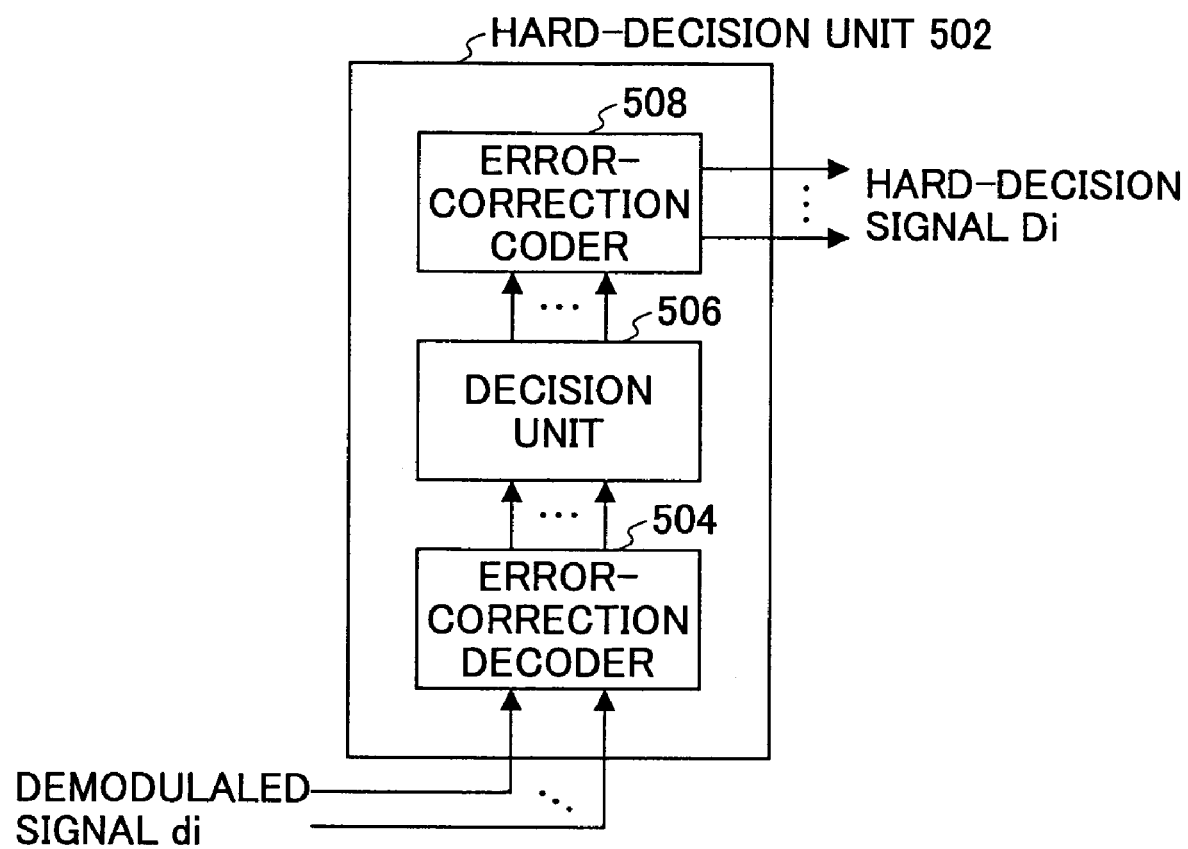
FIG. 5 is a schematic diagram of another variation of a hard-decision unit.

FIG. 5 is a diagram which illustrates another variation of a hard-decision unit. The hard-decision unit 502 may be used in lieu of the hard-decision units 112 and 130 of the first embodiment, or the hard-decision units 312 and 330 of the second embodiment. The hard-decision unit 502 comprises, for the demodulated signal per sub-carrier, an error-correction decoder 504 which performs error-correction decoding, a decision unit 506 which makes the hard decision, and an error-correction coder 508 which performs error-correction coding. According to the present embodiment, the hard decision is made after the error correction so as to enable the improvement in the precision of the hard decision. Hereby, the hard decision is performed with high precision, even when the servicing transmission line is in an adverse environment, so as to enable the appropriate removal of the inter-carrier interference.

Figure 6:
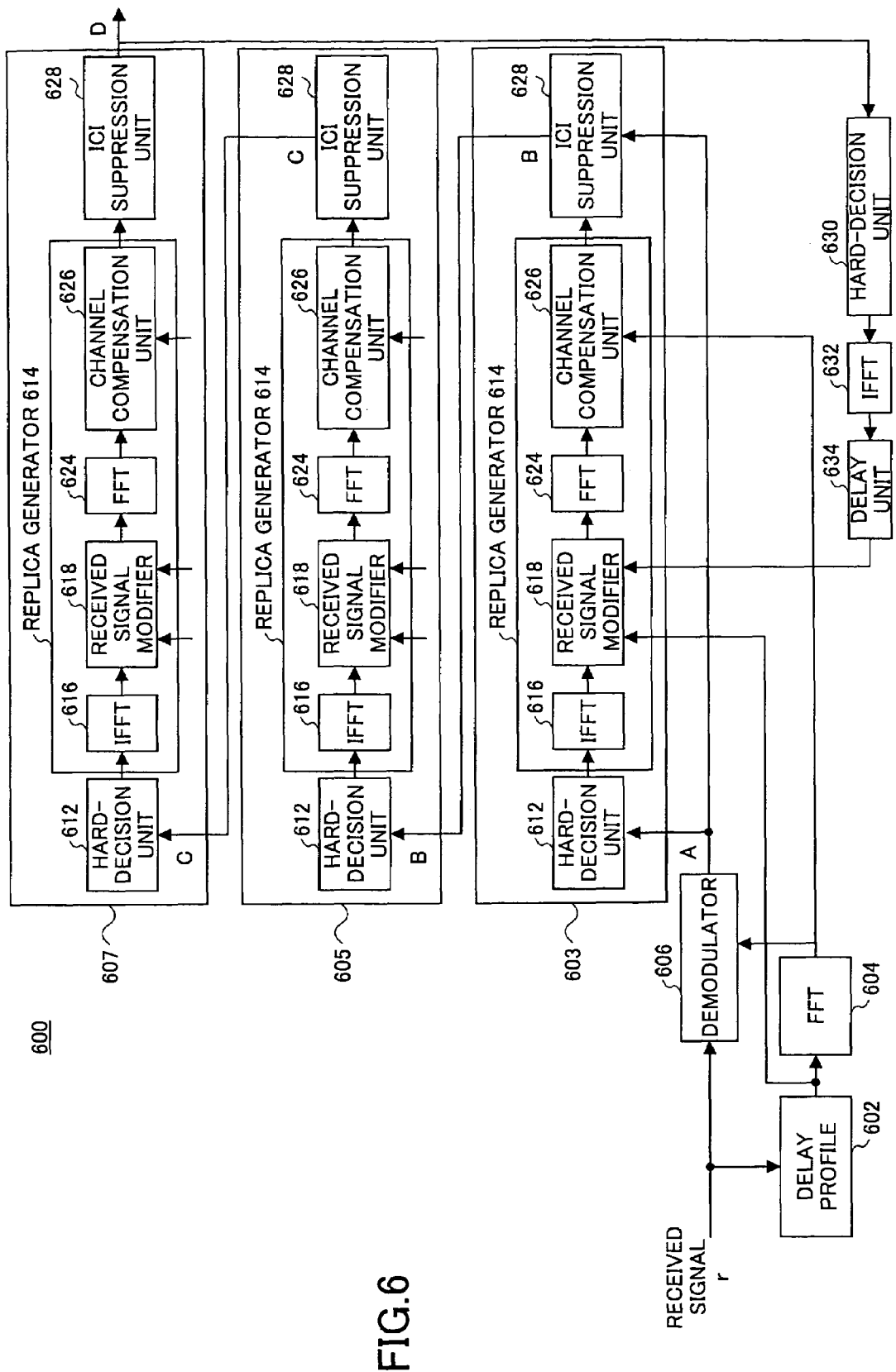
FIG. 6 is a functional block diagram of a receiver according to a third embodiment of the present invention.

FIG. 6 is a functional block diagram of a receiver according to a third embodiment of the present invention. The receiver 600 comprises the delay profile generator 602 which generates the delay profile of the OFDM signal with the guard interval removed. The output of the delay profile generator 602 is provided to the FFT 604 which performs the FFT. The receiver 600 comprises the demodulator 606, the demodulator 606 performing FFT on the received signal and channel compensation using the delay profile so as to output a first demodulated signal A.

The receiver 600 comprises a first demodulated signal modifier 603, the first demodulated signal modifier 603 outputting a second demodulated signal B which modifies the first demodulated signal A. The receiver 600 comprises a second demodulated signal modifier 605, the second demodulated signal modifier 605 outputting a third demodulated signal C which modifies the second demodulated signal B. Furthermore, the receiver 600 comprises a third demodulated signal modifier 607, the third demodulated signal modifier 607 outputting a fourth demodulated signal D. As the first through the third demodulated signal modifiers 603, 605, and 607 comprise similar configurations, only the configuration regarding the first demodulated signal modifier 603 is outlined.

The first demodulated signal modifier 603, as in the first embodiment, comprises the hard-decision unit 612 which makes the hard decision per sub-carrier on the first demodulated signal A. The receiver 600 comprises the replica generator 614 which is connected to the hard-decision unit 612. The replica generator 614 comprises the IFFT 616 which is connected to the hard-decision unit 612 so as to perform IFFT. The replica generator 614 comprises the received signal modifier 618 which is connected to the IFFT 616, the received signal modifier 618 suppressing the interfering component within the received signal so as to add a predetermined signal component to the portion which has included the interfering component. The replica generator 614 comprises the FFT 624 which is connected to the received signal modifier 618 so as to perform FFT. Furthermore, the replica generator 614 comprises the channel compensation unit 626 which is connected to the FFT 624. The output of the channel compensation unit 626 is the replica signal per sub-carrier, adapting the output of the replica generator 614. The receiver 600 comprises the ICI suppression unit 628, the ICI suppression unit 628 suppressing the inter-carrier interference by adding per sub-carrier the difference between the inputs and the outputs of the replica generator 614 to the demodulated signals from the demodulator 606.

Furthermore, the receiver 600 comprises the hard-decision unit 630 which is connected to the ICI suppression unit 628 so as to make the hard decision per carrier on the signal point. The receiver 600 comprises the IFFT 632 which is connected to the hard-decision unit 630 so as to perform inverse Fourier transform. The receiver 600 comprises the delay unit 634 which is connected to the IFFT 632 so as to delay the input signal by a predetermined period.

The operations are described below. The OFDM signal which is received at the receiver 600 is converted to a baseband signal via a wireless unit not illustrated so as to be input to the delay profile generator 602. The delay profile generator 602 determines the delay profile over a predetermined period. The information regarding the delay profile (the timing, the amplitude, and the phase) is provided to the received signal modifier 618 which performs processing in the time domain. Furthermore, the information regarding the delay profile is further converted to information in the frequency domain at the FFT 604 so as to be subsequently provided to the demodulator 606 and the channel compensation unit 626.

The received signal is demodulated at the demodulator 606 so as to output the first demodulated signal A. The first demodulated signal A is provided to the hard-decision unit 612 so as to have the hard decision made per sub-carrier and to be converted to the hard-decision signal. The hard-decision signal is input to the IFFT 616 so as to be converted to the received signal in the time domain. The received signal in the time domain is modified at the received signal modifier 618.

At the receiver 600, as the OFDM symbols are sequentially demodulated per reception of the symbols, the demodulation of the OFDM symbols prior to and including the (k−1)th will have been completed by the time the kth OFDM symbol is demodulated. The respective data of the OFDM symbols prior to and including the (k−1)th symbol are input per sub-carrier to the hard-decision unit 630 so as to have the hard decision made and to be subsequently input to the IFFT 632 and to the delay unit 634 so as to perform the buffering for one symbol period.

At the received signal modifier 618, the kth and the (k−1)th received signals in the time domain are input. Herein, the signal component of the interference section S-I which will cause interference at the time of demodulation of the kth OFDM symbol is extracted from within the (k−1)th OFDM symbol. Then, the signals are combined by adjusting the amplitude and the phase so as to offset the interfering portion S-I of the delayed wave which is included in the received signal in the time domain. Furthermore, at the received signal modifier 618, the section having the length τ which precedes the kth OFDM symbol 208 in the delayed wave 204 is modified by adjusting the timing, the amplitude, and the phase so as to equal the latter portion S-k of the kth OFDM symbol in the delayed wave 204. In other words, the received signal modifier 618 modifies a portion of the delayed wave 204 which is included in the received signal, the modification removing the interfering portion S-I of the (k−1)th OFDM symbol so as to make the signal contents of the removed section S-I and the guard interval GI 216 portion equal to S-k.

The received signal which is modified at the received signal modifier 618 is provided to the FFT 624 so as to be Fourier-transformed and then input to the channel compensation unit 626 so as to be output per sub-carrier as the replica signals d-i.

At the ICI suppression unit 628, the first demodulated signal A is added to the difference between the hard-decision signals D-i and the replica signals d-i so as to output per carrier the modified demodulated signal. The output signal of the ICI suppression unit 628 is provided to the second demodulated signal modifier 605 as the second demodulation signal B. The second and the third demodulation signal modifiers 605 and 607 comprise similar elements so that eventually the output signal of the third demodulated signal modifier 607 is output as the fourth demodulated signal D. The fourth demodulated signal D is provided to the hard-decision unit 630 for subsequent processing.

According to the present embodiment, the first through the third demodulated signal modifiers 603 through 607 are provided so that processing such as the hard-decision processing on the demodulated signals, the generation of the replica signals, and the suppression of the inter-carrier interferences are repeated a plurality of times (three times in the present embodiment). Hereby, the obtaining of demodulated signals with higher precision than in the case of the first embodiment is enabled.

Figure 7:
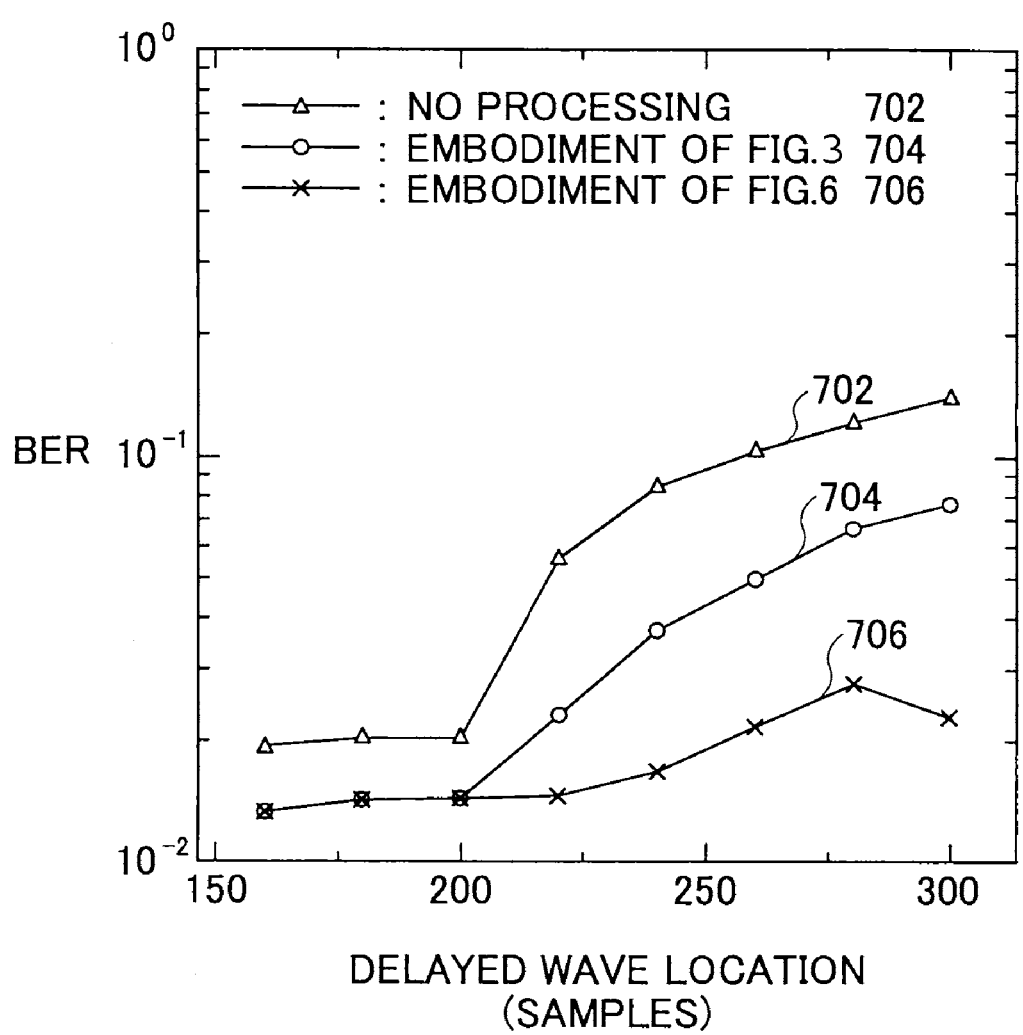
FIG. 7 is a diagram which illustrates a simulation result according to a related-art example and embodiments of the present invention.

FIG. 7 is a diagram which illustrates a simulation result according to the embodiments of the present invention. In the simulation, a time-invariant two-path model is adopted as a transmission line model, assuming an adverse propagation environment with a desired-undesired power ratio of 0 dB and a signal-to-noise ratio of 20 dB. The phase difference of the delayed wave relative to the preceding wave is assumed to be 30 degrees. It is assumed that the number of sub-carriers is 1,024 and that one OFDM symbol comprises 1,224 symbols (of which 200 samples are allocated to the guard interval). The pilot symbol spacing of 16 symbols and the modulation method of 16-QAM are assumed.

In FIG. 7, the vertical axis illustrates the Bit Error Rate (BER), while the horizontal axis illustrates the delay amount of the delayed wave relative to the preceding wave. The graph 702 illustrates the BER characteristics in the case of modulating without performing the processing according to the embodiment of the present invention. The graph 704 illustrates the BER characteristics in the case of performing the processing according to the embodiment as illustrated in FIG. 3. The graph 706 illustrates the BER characteristics in the case of performing the processing according to the embodiment as illustrated in FIG. 6 (where the number of repetitions is five). As described above, as the guard interval has 200 samples, for both the cases according to the embodiments of the present invention 704 and 706 and the case in which the processing according to the embodiment of the present invention is not performed 702, the BER for the section in which the delayed wave covers up to 200 samples only shows a very small value of about $10^{-2}$. However, as the delayed wave covers beyond the guard interval (as the number of samples reaches 200 or more), the BER will degrade. The fact that performing the processing according to the embodiments of the present invention provides a better BER is illustrated. Furthermore, as illustrated in graphs 704 and 706, it is understood that the repetitious modification of the demodulated signal provides a good BER.

It is possible to implement the hard-decision unit, the replica generator, and the ICI suppression unit, etc., according to the embodiments of the present invention as described above, at a relatively small size. Therefore, dealing with the previously feared problems (such as the circuit size, the increase in the computational complexity and the power consumption) is enabled. Furthermore, as the units are not dependent upon the modulation method, the implementation of a system without relying upon the modulation index M is enabled. Furthermore, as processing such as the Maximum-Likelihood Sequence Estimation (MLSE) is not performed, the maintenance of the soft-decision information is enabled. Besides, although the hard-decision process is performed in the embodiments of the present invention, the hard-decision process is performed for evaluating the inter-carrier interference component which is included in the demodulated signal d-i, the demodulated signal with the inter-carrier interference removed (the output of the ICI suppression unit) having the soft-decision information maintained.

Although, in the embodiments of the present invention as described above, the modification at the received signal modifiers 118, 318, and 618 using the received signal in the time domain which is reconstructed based on the result of the tentative demodulation at the demodulators 106, 306, and 606 is performed, it is also possible to perform modification using other signals. For example, it is possible to perform the modulation using a known signal which is received for each of a predetermined number of OFDM symbols. The use of the known signals at the transmitting and the receiving ends enables the modification of the received signal at higher precision. The embodiments of the present invention assume that the contents of the already demodulated OFDM symbol that precedes the target OFDM symbol to be demodulated, are correct. Therefore, assuming that the demodulation result of the preceding OFDM symbol has errors, there is the fear that the errors may lead to a series of ripple effects on the subsequent demodulation results. In the case that such situations are feared, it is advantageous to improve the accuracy of the demodulation by using the known signal.

The present application is based on Japanese Priority Application No. 2003-078717 filed Mar. 20, 2003, with the Japanese Patent Office, the entire contents of which are hereby incorporated by reference.

What is claimed is:

1. A receiver which demodulates an Orthogonal Frequency Division Multiplexing symbol transmitted by an Orthogonal Frequency Division Multiplexing transmitter, comprising:
   a delay profile generation unit which generates a delay profile regarding a preceding wave and a delayed wave which are included in a received signal;
   a demodulation unit which demodulates said received signal so as to output a demodulated signal per sub-carrier;
   a hard-decision unit which makes a hard decision per sub-carrier on a signal point based on said demodulated signal so as to output a hard-decision signal;
   a replica generation unit which uses the hard-decision signal to generate a replica signal per sub-carrier; and
   an inter-carrier interference suppression unit which adds a difference between said hard-decision signal and said replica signal to said demodulated signal so as to suppress an inter-carrier interference;
   wherein said replica generation unit comprises:
   a time-domain received signal generation unit which inverse-Fourier transforms said hard-decision signal so as to generate a received signal in time domain;
   a signal component suppression unit which suppresses, by using a preceding symbol that is an already-demodulated OFDM symbol which precedes a target demodulating symbol that is a target OFDM symbol to be demodulated, a signal component of said preceding symbol which is included in said delayed wave;
   a modified received signal generation unit which adds, before said target demodulating symbol in said delayed wave, a portion of said received signal in said time domain so as to generate a modified received signal; and
   a replica signal generation unit which generates said replica signal by Fourier-transforming said modified received signal.

2. The receiver as claimed in claim 1, wherein said hard-decision unit is adapted to make the hard decision, per sub-carrier on, the signal point based on a signal in which said demodulated signal and the demodulated signal in another diversity branch are combined so as to output the hard-decision signal.

3. The receiver as claimed in claim 1, wherein said hard-decision unit comprises:
   a decoding unit which error-correction decodes said demodulated signal;
   a decision unit which makes the hard decision per sub-carrier on an error-correction decoded signal point from said decoding unit; and
   an output unit which error-correction decodes a hard-decision result from said decision unit so as to output said hard-decision signal.

4. The receiver as claimed in claim 1, further comprising a multi-stage processing route which performs a series of processing including generation of the hard-decision signal, generation of the replica signal, and suppression of the inter-carrier interference.

5. The receiver as claimed in claim 1, further comprising a modified received signal generation unit which further adds a portion of a known signal which is received per predetermined number of OFDM symbols before the demodulated symbol of said delayed wave so as to generate the modified received signal.

6. The receiver as claimed in claim 1, wherein said received signal is modified so as to make signal contents of a portion preceding the target demodulating symbol, which is included in the delayed wave, equal to said portion of the received signal in the time domain.

7. A receiver which demodulates an Orthogonal Frequency Division Multiplexing symbol transmitted by an Orthogonal Frequency Division Multiplexing transmitter, comprising:
- a delay profile generation unit which generates a delay profile regarding a preceding wave and a delayed wave which are included in a received signal;
- a signal component suppression, unit which suppresses, by using a preceding symbol that is an already-demodulated OFDM symbol which precedes a target demodulating symbol that is a target OFDM symbol to be demodulated, a signal component of said preceding symbol which is included in said delayed wave;
- a demodulation unit which demodulates said received signal so as to output a demodulated signal per sub-carrier;
- a hard-decision unit which makes a hard decision per sub-carrier on a signal point based on said demodulated signal so as to output a hard-decision signal;
- a replica generation unit which uses the hard-decision signal to generate a replica signal per sub-carrier; and
- an inter-carrier interference suppression unit which adds a difference between said hard-decision signal and said replica signal to said demodulated signal so as to suppress an inter-carrier interference;

wherein said replica generation unit comprises:
- a time-domain received signal generation unit which inverse-Fourier transforms said hard-decision signal so as to generate a received signal in time domain;
- a modified received signal generation unit which adds, before said target demodulating symbol in said delayed wave, a portion of said received signal in said time domain so as to generate a modified received signal; and
- a replica signal generation unit which generates said replica signal by Fourier-transforming said modified received signal.

8. The receiver as claimed in claim 7, wherein said hard-decision unit is adapted to make the hard decision per sub-carrier on the signal point based on a signal in which said demodulated signal and the demodulated signal at another diversity branch are combined so as to output the hard-decision signal.

9. The receiver as claimed in claim 7, wherein said hard-decision unit comprises:
- a decoding unit which error-correction decodes said demodulated signal;
- a decision unit which makes the hard decision per sub-carrier on an error-correction decoded signal point from said decoding unit; and
- an output unit which error-correction decodes a hard-decision result from said decision unit so as to output said hard-decision signal.

10. The receiver as claimed in claim 7, further comprising a multi-stage processing route which performs a series of processing including the generation of the hard-decision signal, the generation of the replica signal, and the suppression of the, inter-carrier interference.

11. The receiver as claimed in claim 7, further comprising a modified received signal generation unit which further adds, before the demodulated symbol in said delayed wave, a portion of a known signal which is received per predetermined number of OFDM symbols.

12. The receiver as claimed in claim 7, wherein said received signal is modified so as to make signal contents of a portion preceding the target demodulating symbol, which is included in the delayed wave, to be equal to said portion of the received signal in the time domain.

* * * * *